(12) United States Patent  
Liu et al.

(10) Patent No.: US 9,396,728 B2  
(45) Date of Patent: **\*Jul. 19, 2016**

(54) DEVICES AND SYSTEMS FOR REMOTE CONTROL

(71) Applicant: ASUSTek Computer Inc., Taipei (TW)

(72) Inventors: Chia-Chen Liu, Taipei (TW); Yun-Jung Wu, Taipei (TW); Liang-Yi Huang, Taipei (TW); Yi-Hsiu Lee, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,551

(22) Filed: Jul. 22, 2015

(65) Prior Publication Data

US 2015/0325239 A1    Nov. 12, 2015

Related U.S. Application Data

(63) Continuation of application No. 12/367,603, filed on Feb. 9, 2009, now Pat. No. 9,123,344.

(30) Foreign Application Priority Data

Mar. 26, 2008   (TW) .............................. 97110734 A

(51) Int. Cl.
 *G10L 15/00* (2013.01)
 *G10L 15/01* (2013.01)
 (Continued)

(52) U.S. Cl.
 CPC ................. *G10L 15/22* (2013.01); *G10L 15/30* (2013.01); *G10L 17/22* (2013.01); *H04R 1/08* (2013.01)

(58) Field of Classification Search
 CPC ........... G08C 2201/31; G08C 2201/40; G08C 2201/92; G08C 23/04; G08C 17/00; G06F 3/162; G06F 3/021; G06F 3/03543; G06F 3/16; G06F 3/044; G06F 3/167; B60R 25/102; B60R 25/257; G07C 2009/00261; G07C 9/00182; G07C 9/00563; H04B 1/202; H04R 5/00; G10L 15/26; G10L 2015/228; G10L 15/22; G10L 17/22; G10L 15/08; G10L 15/01; G10L 15/02; G10L 15/20; G10L 15/24; G10L 15/265; G10L 2021/0575; G10L 15/30; G10L 19/00; G10L 19/008; G10L 2015/223; G10L 25/48
 See application file for complete search history.

(56) References Cited

U.S. PATENT DOCUMENTS

| 4,121,058 A | 10/1978 | Jusko et al. |
| 4,725,956 A * | 2/1988 | Jenkins ................ B64C 39/024 244/190 |

(Continued)

FOREIGN PATENT DOCUMENTS

| CN | 1177869 | 4/1998 |
| CN | 1253321 | 5/2000 |

(Continued)

OTHER PUBLICATIONS

TW Office Action dated Jul. 28, 2011.

(Continued)

*Primary Examiner* — Abdelali Serrou
(74) *Attorney, Agent, or Firm* — McClure, Qualey & Rodack, LLP

(57) ABSTRACT

Remote controllers and systems thereof are disclosed. The remote controller remotely operates a receiving host, in which the receiving host provides voice input and speech recognition functions. The remote controller comprises a first input unit and a second input unit for generating a voice input request and a speech recognition request. The generated voice input and speech recognition requests are then sent to the receiving host, thereby forcing the receiving host to perform the voice input and speech recognition functions.

7 Claims, 6 Drawing Sheets

(51) Int. Cl.
*G10L 15/02* (2006.01)
*G10L 15/22* (2006.01)
*G10L 17/22* (2013.01)
*H04R 1/08* (2006.01)
*G10L 15/30* (2013.01)

(56) References Cited

U.S. PATENT DOCUMENTS

| | | |
|---|---|---|
| 5,774,039 A | 6/1998 | Housley |
| 5,774,841 A * | 6/1998 | Salazar ............... G10L 15/22 704/225 |
| 5,936,679 A | 8/1999 | Kasahara et al. |
| 6,011,852 A | 1/2000 | Howard |
| 6,125,347 A | 9/2000 | Cote et al. |
| 6,230,136 B1 * | 5/2001 | Yamamoto ............ G10L 21/04 704/212 |
| 6,236,715 B1 | 5/2001 | Wong |
| 6,434,524 B1 | 8/2002 | Weber |
| 6,523,061 B1 | 2/2003 | Halverson et al. |
| 6,587,052 B1 | 7/2003 | Flick |
| 6,654,721 B2 | 11/2003 | Handelman |
| 6,889,191 B2 | 5/2005 | Rodriguez et al. |
| 7,260,538 B2 | 8/2007 | Calderone et al. |
| 7,548,862 B2 | 6/2009 | Kaneko et al. |
| 7,912,186 B2 | 3/2011 | Howell et al. |
| 8,401,860 B1 * | 3/2013 | Evans ................... G10L 15/22 340/945 |
| 2001/0044321 A1 | 11/2001 | Ausems et al. |
| 2002/0052746 A1 | 5/2002 | Handelman |
| 2002/0095294 A1 | 7/2002 | Korfin et al. |
| 2002/0126035 A1 | 9/2002 | Hou |
| 2003/0105637 A1 | 6/2003 | Rodriguez et al. |
| 2004/0064839 A1 | 4/2004 | Watkins |
| 2004/0119580 A1 * | 6/2004 | Spielman ............. B60R 25/102 340/5.52 |
| 2004/0263377 A1 | 12/2004 | Risi et al. |
| 2005/0027539 A1 | 2/2005 | Weber et al. |
| 2006/0276230 A1 | 12/2006 | McConnell |
| 2006/0277460 A1 * | 12/2006 | Forstall ............. G06F 17/30905 715/234 |
| 2007/0018844 A1 | 1/2007 | Sutardja |
| 2007/0073536 A1 | 3/2007 | Clark et al. |
| 2007/0165109 A1 | 7/2007 | Jacobs et al. |
| 2007/0288957 A1 | 12/2007 | Lee |
| 2008/0016544 A1 | 1/2008 | Lee et al. |
| 2008/0100719 A1 | 5/2008 | Huang |
| 2008/0175261 A1 | 7/2008 | Wang |
| 2008/0307301 A1 * | 12/2008 | Decker ............. G06F 17/30905 715/241 |

FOREIGN PATENT DOCUMENTS

| | | |
|---|---|---|
| CN | 1975799 | 6/2007 |
| TW | M273139 | 8/2005 |

OTHER PUBLICATIONS

English language translation of abstract of CN1253321 (published May 17, 2000).
English language translation of abstract of TWM273139 (published Aug. 11, 2005).
Chinese language office action dated Jul. 8, 2010.
English language translation of abstract of CN1975799 (published Jun. 6, 2007).
English Abstract of CN1177869.

* cited by examiner

DEVICES AND SYSTEMS FOR REMOTE CONTROL

CROSS REFERENCE TO RELATED APPLICATIONS

This application is a continuation application of co-pending U.S. application Ser. No. 12/367,603, filed Feb. 9, 2009, now U.S. Pat. No. 9,123,344, which claims priority of Taiwan Patent Application No. 097110734, filed on Mar. 26, 2008, the entirety of which is incorporated by reference herein.

BACKGROUND OF THE INVENTION

1. Field of the Invention

The disclosure relates generally to remote controllers and systems, and more particularly to remote controllers and systems capable of simultaneously providing voice input and speech recognition functions.

2. Description of the Related Art

For conventional remote control systems, users may operate a remote controller to control functions of a corresponding host, such as remotely turning on or off the main power of the host by pressing the key input on the remote controller. With the growth in multimedia and network applications, in addition to providing normal input functions, some remote controllers may further provide speech recognition related functions.

When using a remote controller with a speech recognition function, user may inform the remote host to turn on the speech recognition function via a speech recognition key configured on the remote controller and utilize a microphone speech recognition signal generated by the remote controller for recognition to obtain a control command corresponding to a recognized voice signal recognized by speech recognition software which is embedded on the remote host so as to control operation of the remote host.

In this implementation, however, when the voice input function is turned on and a user requires to perform other functions that require by other software to perform the microphone function, the voice input function software (e.g. network communication software, network instant messaging software, voice recording software or the likes) must be first turned off, before other voice input functions may be performed. Since the voice input key of the remote controller is only capable of turning on or off the voice input function, it is inconvenient for the user to switch back-and-forth between the microphone function and the voice input function.

BRIEF SUMMARY OF THE INVENTION

It is therefore an objective of the invention to provide a simple and efficient remote controller and related system to overcome the aforementioned problems.

Remote controllers and systems thereof are disclosed. An embodiment of the remote control system comprises a remote controller and a receiving host. The receiving host provides speech recognition and microphone functions and both these function can share the same microphone hardware component device. The remote controller at least comprises a first input unit for generating a speech recognition request signal and a second input unit for generating a microphone request signal. The receiving host comprises a first functional module for providing the speech recognition function and a second functional module for providing the microphone function. When receiving the speech recognition request signal generated by the first functional module and the microphone request signal generated by the second functional module, the receiving host is capable of simultaneously directing the first and second functional modules to activate the speech recognition and microphone functions, respectively.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide a remote controller and related system for making a receiving host operate a microphone function (e.g. SKYPE phone or voice recording function) and a speech recognition function (i.e. voice-controlling function) independently. Note that the microphone function is any voice function that may be used for computer systems. According to the operation method of the invention, the microphone function and the speech recognition function may be independently or simultaneously performed, increasing user convenience and providing a simple operation method for users.

Figure 1A:
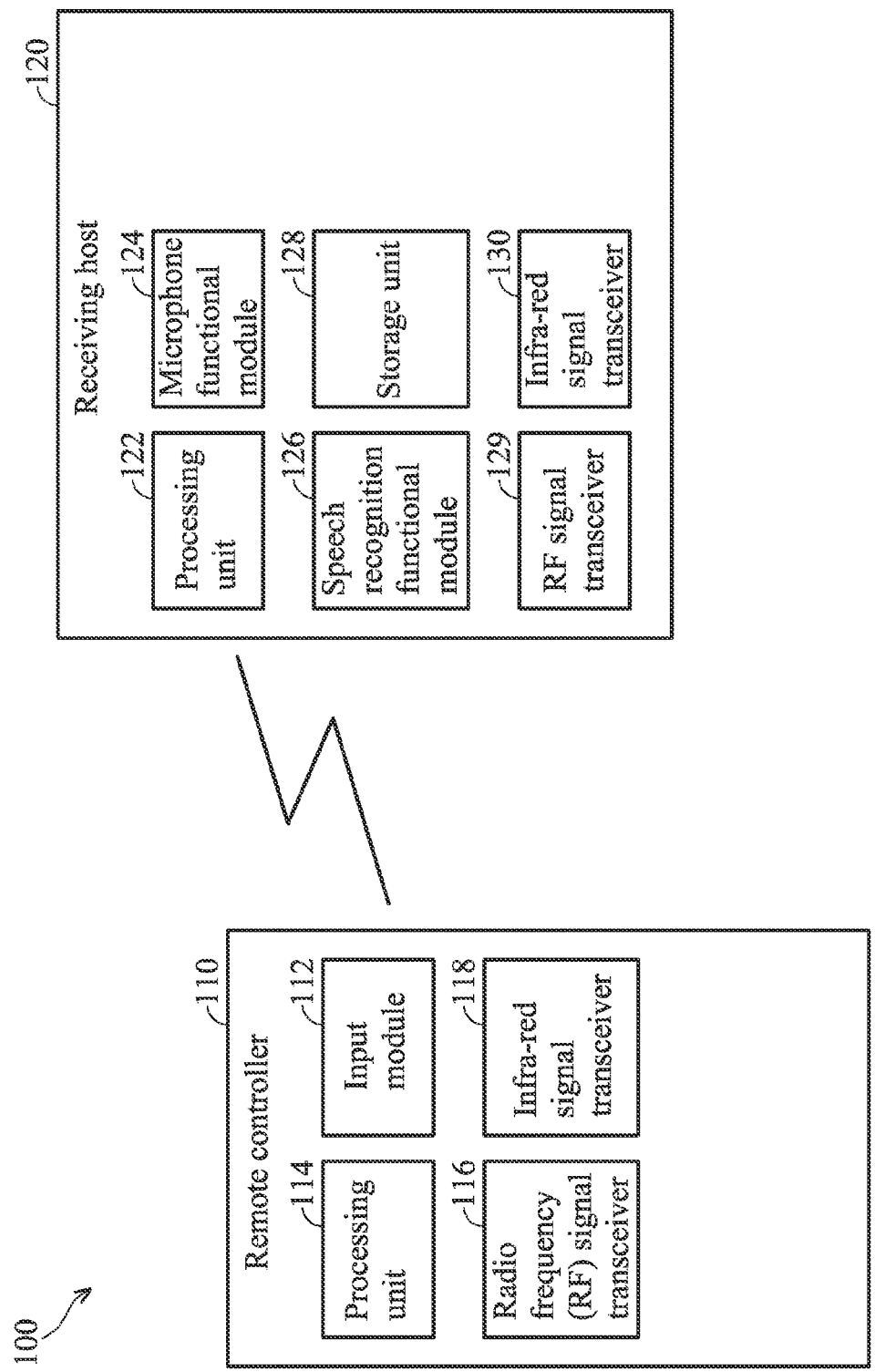
FIG. 1A is a block diagram of an embodiment of a remote control system of the invention.

FIG. 1A is a block diagram of an embodiment of a remote control system 100 of the invention. As shown in FIG. 1A, the remote control system 100 at least comprises a remote controller 110 and a receiving host 120 in which the remote controller 110 is capable of remotely controlling the receiving host 120. The remote control system 100 may be a computer system providing multimedia related functions such as a living room personal computer (PC) that is dedicated for use in the living room. The remote controller 110 comprises an input module 112, a processing unit 114, a radio frequency (RF) signal transceiver 116 and an infra-red signal transceiver 118. The input module 112 may be formed by multiple input units (e.g. a number of keys) for providing an input interface for the users to control the receiving host 120. The receiving host 120 is capable of providing at least one microphone function and one speech recognition function.

Figure 1B:
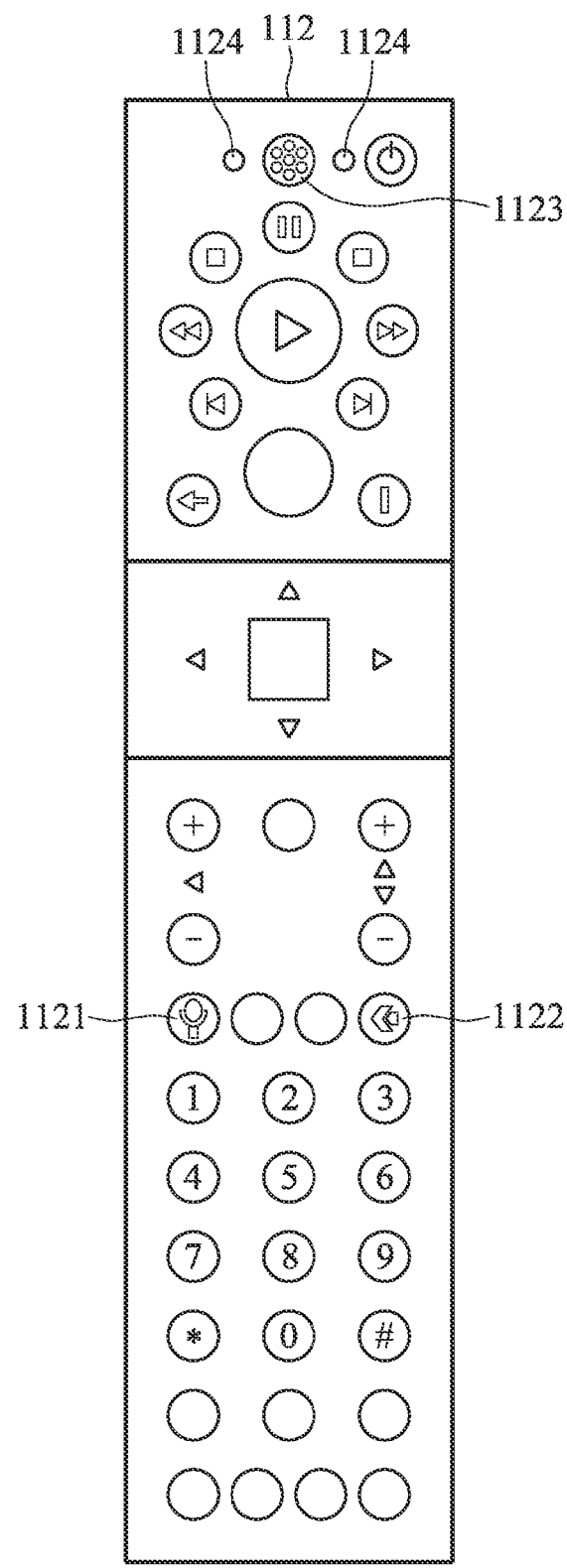
FIG. 1B is a schematic diagram illustrating an embodiment of an input module of a remote controller of the invention.

FIG. 1B is a schematic diagram illustrating an embodiment of an input module 112 of a remote controller 110 of the invention. As shown in FIG. 2B, the input module 112 at least comprises a first input unit 1121 (i.e. a microphone key), a second input unit 1122 (i.e. a speech recognition key) and a microphone unit 1123 (i.e. a microphone input). A user may control the microphone function of the receiving host 120 via the first input unit 1121, control the speech recognition function of the receiving host 120 via the second input unit 1122 and input a voice signal via the microphone unit 1123 (e.g. the microphone). When detecting an input from the input units of the input module 112 (e.g. one of the keys of the input module 112 has been pressed), an input signal (i.e. a signal that contains a key value of the pressed key) will be generated and sent to the processing unit 114. The processing unit 114 may then convert the input signal (i.e. a signal that contains a key value of the pressed key) to a corresponding infra-red control code and transmit a relative control command or request containing the corresponding infra-red control code to the receiving host 120 via the infra-red signal transceiver 118.

When detecting that the first input unit 1121 has been pressed, the processing unit 114 may transmit an infra-red control code which corresponds to the control of the microphone function, serving as the control command or request, to the receiving host 120 via the infra-red signal transceiver 118 to control the microphone function of the receiving host 120 while the voice signal may be transmitted via the RF signal transceiver 116. The RF signal transceiver 116 may be, for example, any wireless modules capable of performing a wireless transmission such as a Blue-tooth module.

The receiving host 120 comprises a processing unit 122, a microphone functional module 124, a speech recognition functional module 126, a storage unit 128, an RF signal transceiver 129 and an infra-red signal transceiver 130. The microphone functional module 124 may comprise software applications corresponding to execution of the microphone function for turning on or off the microphone function of the receiving host 120. The speech recognition functional module 126 may comprise software applications corresponding to execution of the speech recognition function for turning on or off the speech recognition function of the receiving host 120. The storage unit 128 has a database (not shown), which at least stores multiple files (e.g. multimedia files) and multiple recognition patterns, wherein each recognition pattern comprises a specific voice signal and corresponds to a specific function of the receiving host 120. For example, a recognition pattern "Open the webpage" may correspond to a webpage opening function of the receiving host 120 for opening the webpage.

When the infra-red signal transceiver 130 receives a request/signal or control command transmitted by the remote controller 110, the processing unit 122 may perform a corresponding operation that corresponds to the received request/signal or control command. Similarly, the voice signal may be transmitted via the RF signal transceiver 129. Operations of the operation method will be detailed as follows.

In one embodiment, a user may manually turn on or off the microphone function of the receiving host 120 via the microphone key 1121 of the remote controller 110.

Figure 2:
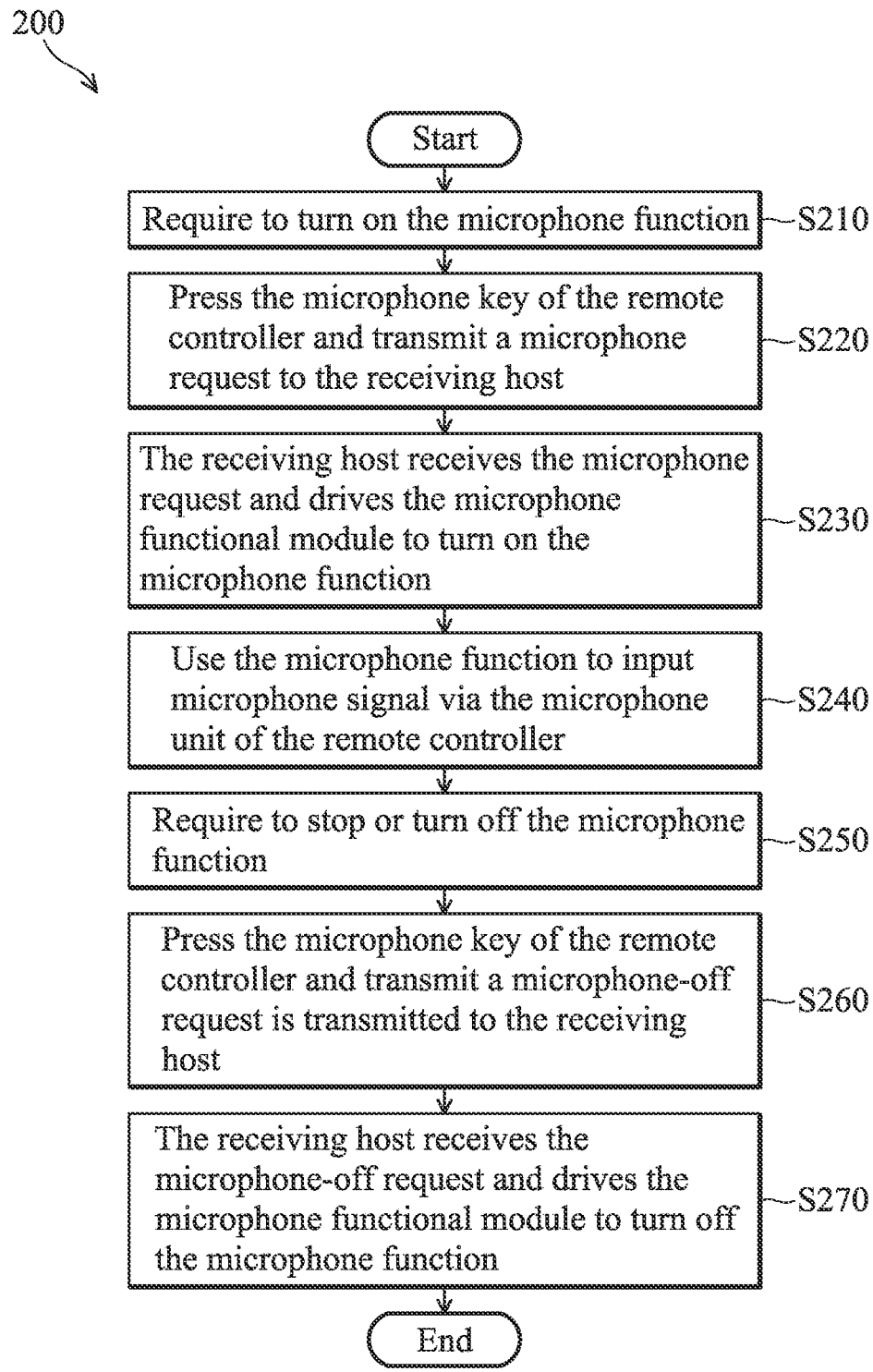
FIG. 2 is a flowchart of an embodiment of an operation method of the invention.

FIG. 2 is a flowchart of an embodiment of an operation method of the invention. Please refer to both FIGS. 1A and 1B. When the user requires to turn on the microphone function (step S210), the microphone key 1121 (i.e. first input unit) of the remote controller 110 is pressed and a microphone request signal (i.e. a microphone-on request) is transmitted to the receiving host 120 (step S220). When receiving the microphone request signal, the receiving host 120 drives the microphone functional module 124 (i.e. first functional module) to turn on the microphone function (step S230). Accordingly, a user may use the microphone function, such as speaking by voice with another user, via the microphone unit 1123 of the remote controller 110 (step S240).

Thereafter, when the user requires to stop or turn off the microphone function (step S250), the microphone key 1121 of the remote controller 110 is once again pressed and a microphone-off request is transmitted to the receiving host 120 (step S260). When receiving the microphone-off request, the receiving host 120 drives the microphone functional module 124 to turn off the microphone function (step S270).

It is to be noted that requests sent by the remote controller 110 may be an infra-red control code (IR code) transmitted to the receiving host 120 via an infra-red interface and the receiving host 120 may turn on or off the microphone functional module 124 and the speech recognition functional module 126 according to the commands corresponding to the received request after the receiving host 120 receives the requests (IR codes) sent by the remote controller 110. For example, the microphone functional module 124 may be driven to turn on the microphone function when the receiving host 120 receives a microphone request signal while the microphone functional module 124 may be driven to turn off the microphone function when the receiving host 120 receives a microphone-off request.

Similarly, in another embodiment, a user may manually turn on or off the speech recognition function of the receiving host 120 via the speech recognition key 1122 of the remote controller 110.

Figure 3:
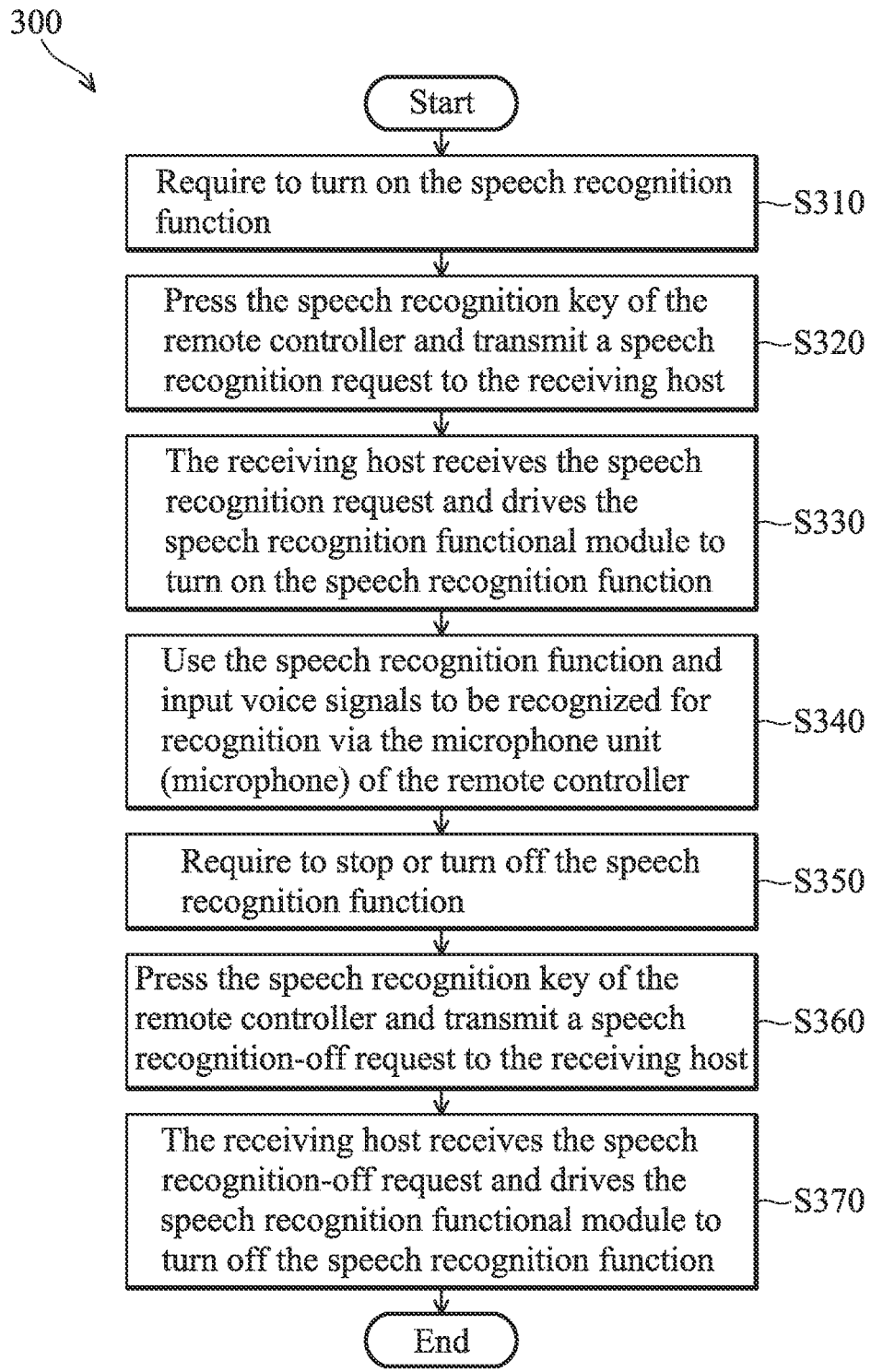
FIG. 3 is a flowchart of another embodiment of an operation method of the invention.

FIG. 3 is a flowchart of another embodiment of an operation method of the invention. Please refer to both FIGS. 1A and 1B. When the user requires to turn on the speech recognition function (step S310), the speech recognition key 1122 (i.e. second input unit) of the remote controller 110 is pressed and a speech recognition request (i.e. a speech recognition-on request) is transmitted to the receiving host 120 (step S320). When receiving the speech recognition request, the receiving host 120 drives the speech recognition functional module 126 (i.e. second functional module) to turn on the speech recognition function (step S330). Accordingly, a user may use the speech recognition function and input voice signals to be recognized for recognition via the microphone unit 1123 (the microphone) of the remote controller 110 (step 340). When receiving data to be recognized, the processing unit 122 of the receiving host 120 may analyze the inputted data that is to be recognized. Compared the inputted data with the recognition patterns in the database and activating a corresponding function when finding a matched item that matches with the inputted data in the database, such as activating a specific application or generating a file attribute of the desired files for performing a file search of the database. For example, when receiving data that is to be recognized with the recognition pattern "Open the webpage" by the receiving host 120, the processing unit 122 may compare the recognition patterns stored in the database and may perform a webpage opening function for opening the webpage after a matched item "Open the webpage" has found.

In other words, a voice-controlling function may be provided by the speech recognition key 1122 of the remote controller 110 such that a user may perform a voice-controlling operation. For example, a user may configure recognition patterns corresponding to functions that are frequently used, such as using a recognition pattern "Open the webpage" to represent a request for the execution of the function for opening the webpage, in advance, instead of the originally key inputting operation, thereby providing a more convenient operation by the voice-controlling operation.

Thereafter, when the user requires to stop or turn off the speech recognition function (step S350), the speech recognition key 1122 of the remote controller 110 is once again pressed and a speech recognition-off request is transmitted to the receiving host 120 (step S360). When receiving the speech recognition-off request, the receiving host 120 drives the speech recognition functional module 126 to turn off the speech recognition function (step S370).

The remote controller 110 may further comprise an indicator light 1124 (referring to FIG. 1B) for indicating the current execution or operation status of the microphone function or the speech recognition function by blinking the indicator light 1124 with various ways. The indicator light 1124 may blink quickly for indicating that the microphone has been pressed and a request is being sent to the receiving host 120. When the receiving host 120 turns on the microphone function and replies to the remote controller 110, the indicator light 1124 is turned off for indicating that a user may input voice signals now via the RF signal transceivers 116 and 129. It is to be understood that the indicator light 1124 may utilize different numbers/amount, colors or blinking types for indicating different operation statuses for the user, depending on the user requirement.

In addition to turning on or off the microphone function or the speech recognition function independently, in another embodiment, a user may simultaneously turn on both the microphone function and the speech recognition function.

Figure 4:
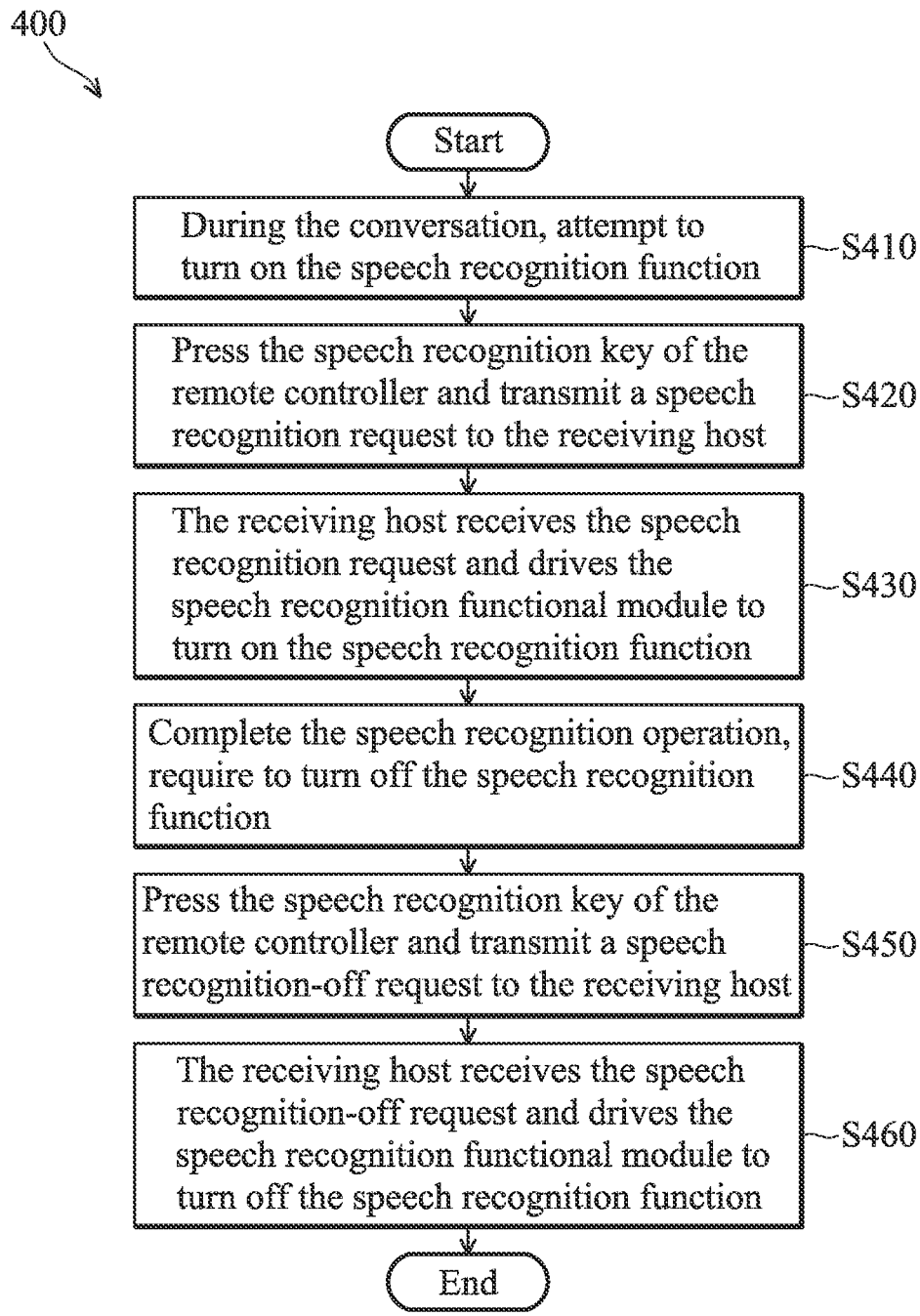
FIG. 4 is a flowchart of yet another embodiment of an operation method of the invention.

FIG. 4 is a flowchart of yet another embodiment of an operation method of the invention. Please refer to both FIGS. 1A and 1B. In this embodiment, it is assumed that the microphone function has already been turned on and user is speaking by inputting voice signals via the microphone. During the conversation, in step S410, if the user attempts to turn on the speech recognition function at the same time, in step S420, the speech recognition key 1122 of the remote controller 110 is pressed and a speech recognition request is transmitted to the receiving host 120. When receiving the speech recognition request, in step S430, the receiving host 120 drives the speech recognition functional module 126 to turn on the speech recognition function. Therefore, the receiving host 120 simultaneously performs the microphone and speech recognition functions.

Thereafter, when the user completes the speech recognition operation and requires to turn off the speech recognition function (step S440), the speech recognition key 1122 of the remote controller 110 is once again pressed and a speech recognition-off request is transmitted to the receiving host 120 (step S450). When receiving the speech recognition-off request, the receiving host 120 drives the speech recognition functional module 126 to turn off the speech recognition function (step S460). At this time, only the voice-recognizing function will be tuned off by the receiving host 120 and the microphone function will still be operational. Similarly, users may choose to later, press the microphone key 1121 of the remote controller 110 to turn off the microphone function.

Figure 5:
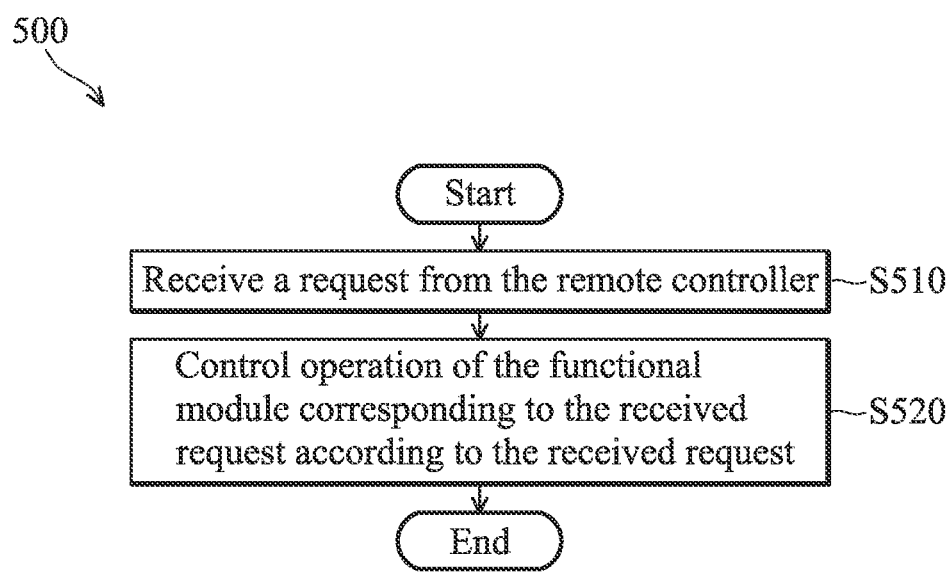
FIG. 5 is a flowchart of still another embodiment of an operation method of the invention for illustrating how the receiving host controls a corresponding functional module according to a received request.

FIG. 5 is a flowchart 500 of still another embodiment of an operation method of the invention for illustrating how the receiving host 120 controls a corresponding functional module according to a received request. It is assumed that the receiving host 120 has received a request from the remote controller 110 via the infra-red signal transceiver 129 (step S510). The receiving host 120 then controls operation of the functional module corresponding to the received request according to the received request (step S520). When the received request is a microphone request signal, the receiving host 120 drives the microphone functional module 124 to turn on the microphone function. When the received request is a speech recognition request, the receiving host 120 drives the speech recognition functional module 126 to turn on the speech recognition function. When the received request is a microphone-off request, the receiving host 120 drives the microphone functional module 124 to turn off the microphone function. When the received request is a speech recognition-off request, the receiving host 120 drives the speech recognition functional module 126 to turn off the speech recognition function. In other words, the remote controller 110 may issue different commands to determine whether and when to turn on/off the microphone function and the speech recognition function.

It is to be noted that the four aforementioned requests are only used for explanation, but the invention is not limited thereto. In other words, various requests may be configured according to user requirement of the used country or area for implementing and providing various multimedia services.

In summary, according to the remote control system and related operation method of the invention, execution of the microphone function and speech recognition function can be individually controlled by two independent input units (such as a microphone key and a speech recognition key) configured on the remote controller, thus providing more convenient operation interface and diversification services for users. Furthermore, the speech recognition function can be performed while the microphone function is being performed, thus providing a voice-controlling function. Therefore, users may utilize the voice-controlling function for inputting instead of the conventional method of inputting by pressing of keys, thus making operation more convenient and satisfactory.

Certain terms are used throughout the description and claims to refer to particular system components. As one skilled in the art will appreciate, consumer electronic equipment manufacturers may refer to a component by different names. This document does not intend to distinguish between components that differ in name but not function.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A remote control system, comprising:
   a remote controller having a microphone which provides speech signals, a first input unit generating a speech recognition request signal, and a second input unit generating a microphone request signal; and
   a receiving host, having:
   a speech recognition functional module providing a speech recognition function, wherein the speech recognition functional module recognizes the speech signals received from the microphone of the remote controller;
   a microphone functional module providing a microphone function, wherein when the receiving host receives the microphone request signal from the remote controller, the microphone functional module is activated;
   wherein:
   the speech signals, the microphone request signal and the speech recognition request signal are sent from the remote controller to the receiving host and when the receiving host receives the speech recognition request signal from the remote controller, the speech recognition functional module is activated to recognize the speech signals that are received from the remote controller, and when the receiving host receives the microphone request signal from the remote controller, the microphone functional module is activated;
   wherein the receiving host selectively performs the speech recognition function and the microphone function to process the speech signals;

when in a first mode of operation of the receiving host, the microphone function is activated and the speech recognition function is deactivated; and when in a second mode of operation of the receiving host, the microphone function is activated and the speech recognition function is activated.

2. The remote control system of claim 1, wherein the remote controller further comprises:
   a first signal transceiver, transmitting the microphone request signal or the speech recognition request signal to the receiving host; and
   a second signal transceiver, transmitting the speech signals to the receiving host.

3. The remote control system of claim 2, wherein the first signal transceiver is an infra-red signal transceiver and the second signal transceiver is a radio frequency signal transceiver.

4. The remote control system of claim 1 further comprising a storage unit, storing database having at least one recognition pattern, wherein the receiving host further comprises a processing unit and when receiving data to be recognized from the remote controller, the processing unit compares the received data with the at least one recognition pattern of the database and activates a corresponding function when finding a matched item in the database.

5. The remote control system of claim 1, wherein the receiving host further receives a speech-related command from a user for performing a speech-controlling operation after the speech recognition function has been activated.

6. A method for remote control of receiving host, wherein the receiving host provides a speech recognition function and a microphone function, a microphone request signal generated by a remote controller for controlling the microphone function of the receiving host, and a speech recognition request signal generated by the remote controller for controlling the speech recognition function of the receiving host, the method comprising:
   upon receiving the microphone request signal, selectively activating, by the receiving host, the microphone function, such that speech signals from the remote controller are received by the receiving host, wherein for the microphone function, the receiving host receives a microphone request signal from the remote controller to activate the microphone function; and
   upon receiving the speech recognition request signal, selectively activating, by the receiving host, the speech recognition function for recognizing the speech signals received from the remote controller, wherein for the speech recognition function, the receiving host receives a speech recognition request signal from the remote controller to activate the speech recognition function so as to recognize the speech signals received from the remote controller after the speech recognition function is activated;
   wherein:
      in a first mode of operation of the receiving host, the microphone function is activated and the speech recognition function is deactivated; and
      in a second mode of operation of the receiving host, the microphone function is activated and the speech recognition function is activated.

7. A receiving host, adapted to a remote controller having a microphone which provides speech signals, and the remote controller independently generates a microphone request signal by a first input unit and a speech recognition request signal by a second input unit, and the speech signals, the microphone request signal and the speech recognition request signal are sent from the remote controller to the receiving host, the receiving host comprising:
   a speech recognition functional module providing a speech recognition function; and
   a microphone functional module providing a microphone function, and when the receiving host receives the speech recognition request signal from the remote controller, the speech recognition functional module is activated to recognize the speech signals that received from the remote controller, and when the receiving host receives the microphone request signal from the remote controller, the microphone functional module is activated;
   wherein the receiving host selectively performs the speech recognition function and the microphone function to process the speech signals; when in a first mode of operation of the receiving host, the microphone function is activated and the speech recognition function is deactivated; and when in a second mode of operation of the receiving host, the microphone function is activated and the speech recognition function is activated.

* * * * *